A. S. HUBBARD.
ELECTRICAL SYSTEM OF DISTRIBUTION.
APPLICATION FILED DEC. 10, 1908. RENEWED JULY 8, 1911.
1,003,747.
Patented Sept. 19, 1911.
2 SHEETS—SHEET 1.
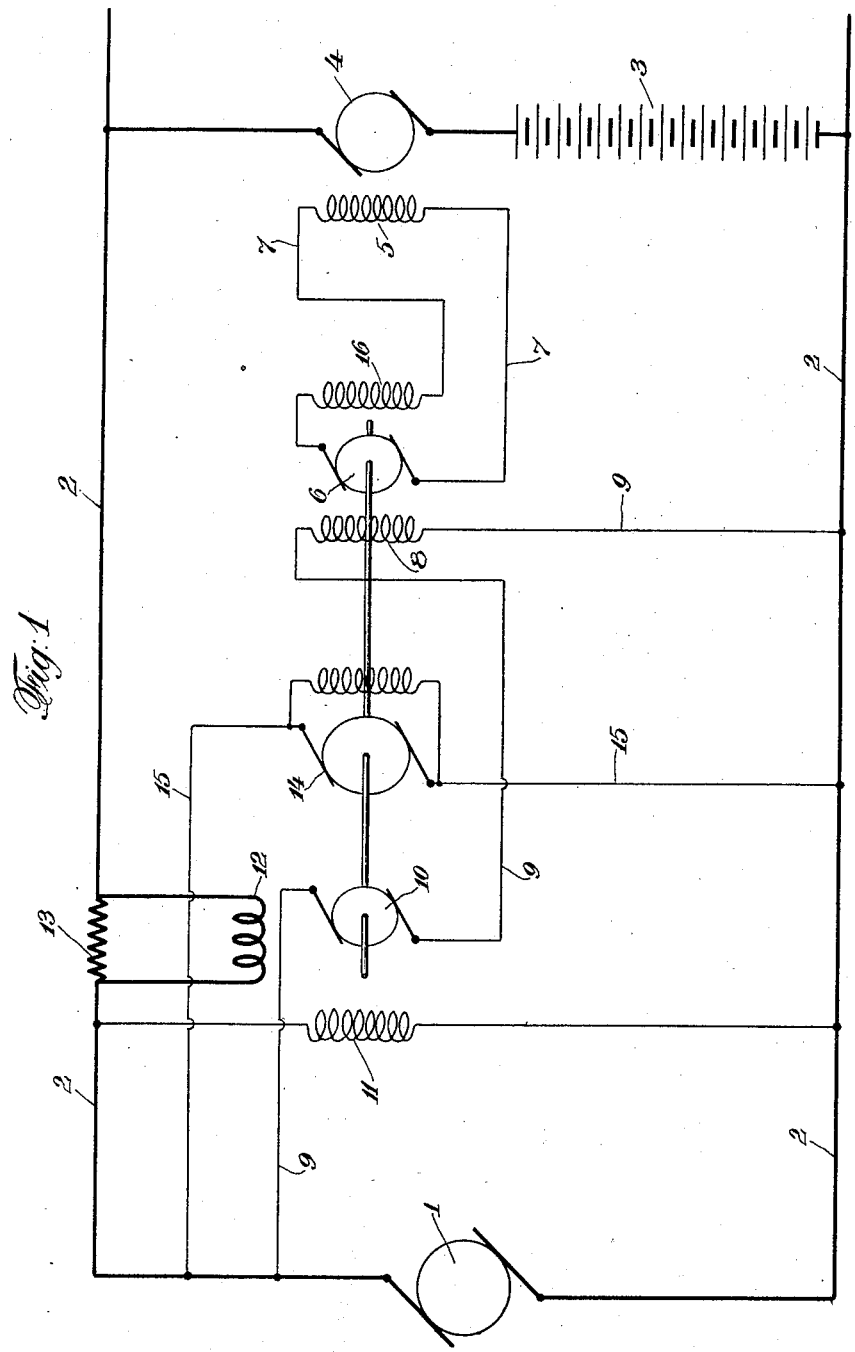

A. S. HUBBARD.
ELECTRICAL SYSTEM OF DISTRIBUTION.
APPLICATION FILED DEC. 10, 1908. RENEWED JULY 8, 1911.
1,003,747.
Patented Sept. 19, 1911.
2 SHEETS—SHEET 2.
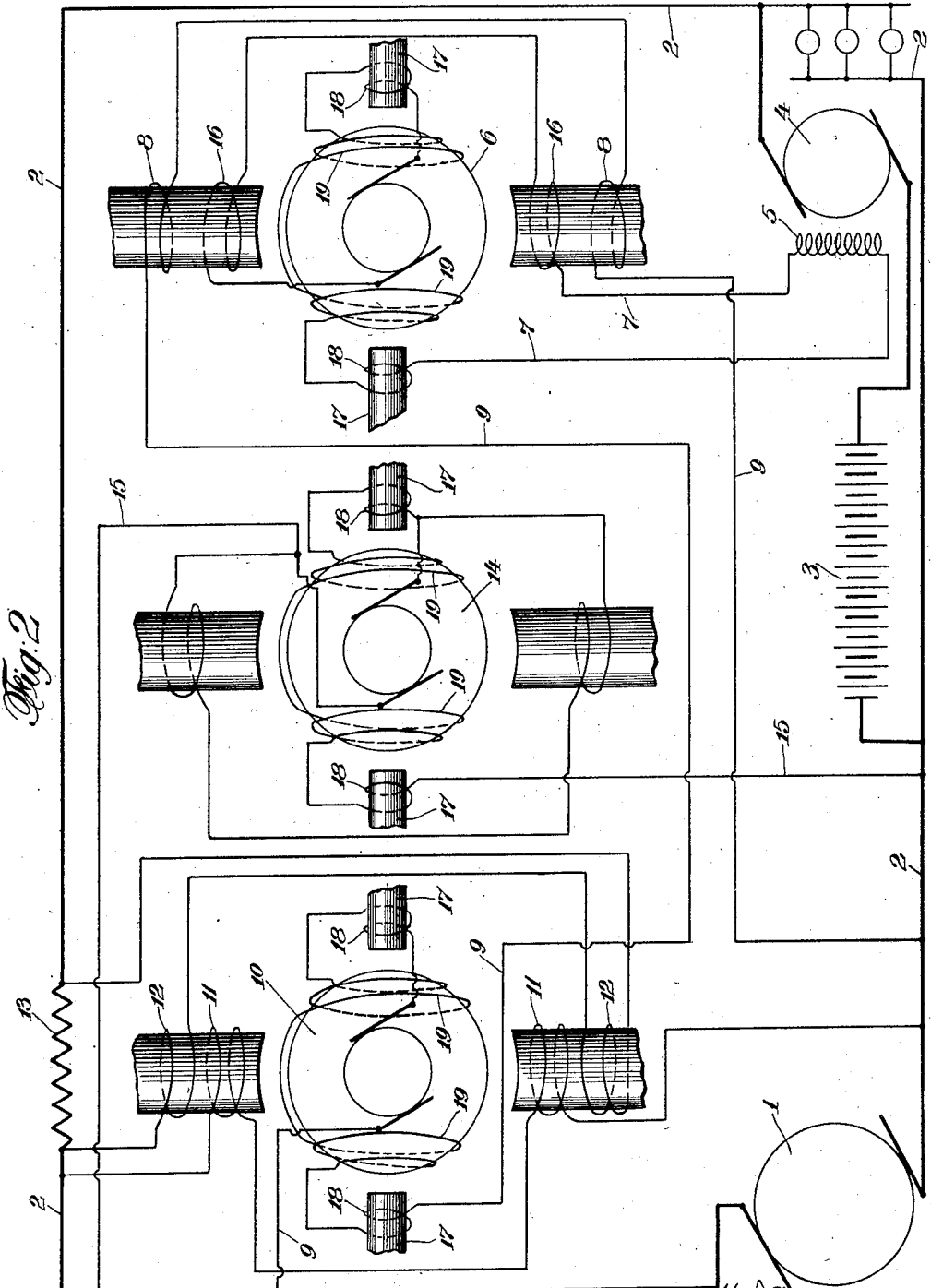

UNITED STATES PATENT OFFICE.

ALBERT S. HUBBARD, OF BELLEVILLE, NEW JERSEY, ASSIGNOR TO GOULD STORAGE BATTERY COMPANY, A CORPORATION OF NEW YORK.

ELECTRICAL SYSTEM OF DISTRIBUTION.

1,003,747. Specification of Letters Patent. Patented Sept. 19, 1911.

Application filed December 10, 1908, Serial No. 466,769. Renewed July 8, 1911. Serial No. 637,530.

*To all whom it may concern:*

Be it known that I, ALBERT S. HUBBARD, a citizen of the United States, and a resident of Belleville, county of Essex, and State of New Jersey, have invented certain new and useful Improvements in Electrical Systems of Distribution, of which the following is a specification.

My invention relates to electrical systems of distribution and more especially comprehends a novel form of dynamo-electric machine and its arrangement in such systems.

I have especially designed my improvements with relation to systems in which a booster and battery are arranged to regulate the load on the main generator of the system. In such systems it is important to have the regulating devices respond quickly, and, while quick response may be obtained with small machines, with large machines sluggishness in operation is a serious detriment. To overcome this disadvantage I propose to apply a relatively high voltage to various of the regulating machines. I do this since the higher voltage applied to the machines the less the time in which they will magnetize. For instance, if 20 volts be applied to a certain booster field it will reach its normal magnetization in ten seconds, but if 200 volts be applied to the same field it will attain the same magnetization in about one second. It is, therefore, desirable to cause such an excess voltage to be applied to the booster, but after the booster has reached the proper excitation the exciting voltage of the booster should be cut down to a normal value. In order to bring about this last result I wind the field of the exciter differentially with an opposing field coil which is designed to cut down the exciter voltage as the booster reaches its proper excitation. I place the opposing field coil in series with the exciter armature and the booster field so that it is responsive to the booster field excitation.

Further objects, advantages and improvements will more clearly appear from the detailed description given below taken in connection with the accompanying drawings which form a part of this specification.

In the drawings, Figure 1 represents diagrammatically a system embodying one form of my invention. Fig. 2 is a similar diagram showing another embodiment of my improvements.

Referring to Fig. 1, 1 represents a main generator supplying the feed or work circuit 2, 2. Across the circuit 2, 2, is connected the storage battery 3, and in series therewith a booster 4. The booster 4 is provided with a field coil 5 which is connected in series with the armature of an exciter 6 in a circuit 7. The exciter 6 is provided with a field coil 8 which lies in a circuit 9 in series with the armature of a counter-electromotive force dynamo 10. The machine or dynamo 10 is connected across the circuit 2, 2, by the conductors 9 and is arranged to generate a voltage in opposition to that produced at the circuit 2, 2. This counter machine 10 is provided with a fine wire field coil 11 connected to any substantially constant source of electromotive force so that it produces a substantially constant magneto-motive force in the field of the machine. Wound to oppose the coil 11 is a second and coarse wire field coil 12 which is connected to carry a current which varies as the current in the circuit 2, 2. In the present instance this is accomplished by connecting the coil 12 in parallel with a shunt resistance 13 connected in series in the circuit 2, 2. The counter machine 10 and the exciter 6 are driven at a substantially constant speed by a shunt motor 14 connected across the circuit 2, 2, by means of conductors 15, 15.

The field 12 of the counter machine 10 is normally stronger than its opposing field 11, so that when the normal amount of current is flowing in the circuit 2, 2, it produces a voltage in the counter machine exactly equal but in the opposite direction to the voltage applied to the machine by the circuit 2, 2. When an increase in load falls upon the circuit 2, 2, the increased current in the field coil 12 causes the counter machine to produce a voltage in such a direction that a current is caused to flow in the field 8 of the exciter 6, which in turn generates a voltage in the proper direction to excite the booster 4 and cause it to generate a voltage to aid the battery and cause it to discharge and take the excess load. When a diminution of load occurs on the system the reverse operations take place and cause the battery to be charged from the circuit 2, 2. The coil 11 allows a much heavier current to be employed in the opposing coil 12 and hence increases its regulating effect upon the counter machine 10 to increase the closeness of regulation.

The field coil 8 of the exciter 6 is wound to produce an excess voltage therein, that is, a voltage, which is much larger than necessary to produce the required voltage in the booster 4. Upon the flowing of the regulating current in the field 8, the exciter 6 will therefore produce an excess voltage at the terminals of the field coil 5 of the booster which will cause the booster to reach its proper magnetization much quicker. However, it is not desired that this excess voltage be maintained after the field 5 has reached its proper magnetization and in order to cut down this excess voltage at the proper time I provide in series with the field coil 5 and the armature of the exciter 6, a field coil 16 on exciter 6 and opposing the field coil 8. Immediately the excess current passes through the field 8 an excess voltage is applied to the booster field 5 by the exciter, but as the current in the field 5 increases and the magnetization of the booster 4 is brought to its proper value, the current in the field 16 increases, thus cutting down the excitation, and consequently the voltage, of the exciter 6 to the proper value to maintain the required regulating current. In this way the advantage of the high initial voltage fed to the booster field is obtained to get the quickness of action and the differential series field winding 16 operates to cut this voltage down at the proper time.

All the regulating machines shown are subject to variations of load and other conditions and in order that they may well meet the conditions imposed upon them, I provide them with the improvements shown in Fig. 2. Referring to Fig. 2, the same general arrangement as in Fig. 1 is shown. In this figure, however, each of the machines 6, 10 and 14 is provided with commutation lugs 17. These lugs are in the form of poles placed between the main poles and maintain good commutation during the varying conditions imposed upon the machines. The poles 17 are excited by coils 18 in series with the armatures of the respective machines. The machines 6, 10 and 14 are also provided with coils 19 which neutralize and compensate for armature reaction. The coils 19 are arranged to set up a magneto-motive force in an exactly opposite direction from that set up by the armature current. The coils 19 are also arranged in series with the armatures so that their currents vary with the armature current and they will effectively neutralize the armature reaction. Such a machine designed as a generator is clearly described in United States Letters Patent No. 591,024 to Milton E. Thompson. Such a machine, however, has special advantages in a system of the class described since it is well adapted to meet the varying conditions peculiar to such systems.

From the above it is evident that I have provided an arrangement which greatly decreases the time losses in the regulating apparatus due to hysteresis and other causes and have provided an arrangement which is extremely sensitive and in which the quickness of response of the booster can be made substantially anything desired.

Although I have described and shown specific embodiments of my improvements, and those in great detail, nevertheless I do not desire to be limited to such details, except as clearly specified hereinafter in the claims since many changes and modifications may be made within the spirit and scope of my invention, but, Having fully and clearly shown and described my invention, what I claim and desire to secure by Letters Patent, is:

1. In an electrical system of distribution, the combination of a main circuit, a battery connected across said circuit, a booster in series with the battery, an exciter in series with the booster field, a field coil for the exciter subject to variations in the electrical condition of the system and an opposing field coil for the exciter connected in series with the booster field.

2. In an electrical system of distribution, the combination of a main circuit, a storage battery in operative relation therewith, a booster, a dynamo for exciting the booster field subject to variations in the electrical condition of the system, and means subject to variations of current in the booster field for cutting down the voltage of the exciting dynamo.

3. In an electrical system of distribution, the combination of a main circuit, a storage apparatus in operative relation therewith, a booster, an exciter for said booster subject to variations in the electrical condition of the system, and means subject to variations in the electrical condition of the exciter, for cutting down the voltage of the exciter.

4. In an electrical system of distribution, the combination of a feed circuit, a storage battery, a booster in operative relation therewith, an exciter for the booster field, means, responsive to variations in the electrical condition of the system, for over exciting the exciter and means for cutting down the excitation of the exciter.

5. In an electrical system of distribution, the combination of a storage apparatus, a booster in operative relation therewith, an exciter for said booster provided with means for over exciting the exciter and means tending to cut down its output as its output tends to increase.

6. In an electrical system of distribution, the combination of a feed circuit, a storage apparatus connected thereto, a booster in operative relation therewith, an exciter for said booster, a field coil for said exciter tending to over excite the same and a second field coil, responsive to current changes in the exciter armature and opposing said first mentioned field coil to cut down the excitation of the exciter.

7. In an electrical system of distribution, the combination of a feed circuit, a storage battery connected thereto, a booster therefor, a field coil for the booster, an exciter for said field coil and in series therewith, a field coil for said exciter, means for feeding said last mentioned field coil responsive to current changes in said circuit, and a second field coil for said exciter opposing the other field coil on the exciter and in series with the booster field.

8. In an electrical system of distribution, the combination of a feed circuit, a booster operatively connected therewith, means responsive to variations in the electrical condition of the system for applying an excess voltage to the booster field and means for cutting down said excess voltage as the excitation of the booster increases.

9. In an electrical system of distribution, the combination of a work circuit, a booster in operative relation therewith, an exciting dynamo for said booster, means for over-exciting said dynamo to cause it to apply an excess electro-motive force to said booster, and a coil on said exciting dynamo arranged to cut down said over-excitation, said exciting dynamo being provided with commutation lugs and coils in series with its armature to improve the commutation and neutralize and compensate for armature reaction.

10. In an electrical system of distribution, a storage apparatus, a regulating electric machine therefor, means arranged to over-excite the regulating machine and a coil arranged to cause said over-excitation to be cut down, said coil being connected to be responsive to variations in the output of the regulating machine.

11. In an electrical system of distribution, a source of electrical energy, a circuit supplied thereby, a storage apparatus, means for regulating the division of load between said source and apparatus, said means including a regulating dynamo, means for over-exciting said dynamo responsive to certain electrical variations and acting to cause said over-excitation to be cut down responsive to increases in the output of said dynamo as the effect of the regulating dynamo increases.

12. In an electrical system of distribution, a source of electrical energy, a circuit supplied thereby, a compensatory storage apparatus and regulating dynamo therefor and means for applying an abnormal voltage to the field of the regulating dynamo to cause it to build up quickly responsive to electrical variations in the system, and means for cutting down the effect of said excess voltage after its effect has been felt.

13. In an electrical system of distribution, a source of electrical energy, a circuit supplied thereby a compensating storage apparatus therefor, a regulating dynamo therefor, an exciter for applying an excess voltage to the field of the dynamo and means for cutting down the effect of said excess voltage after its effect has been felt as when the dynamo has reached its proper voltage.

14. In an electrical system of distribution, a source of electrical energy, a circuit supplied thereby a compensatory storage battery therefor, a regulating dynamo therefor and means tending to over-excite said dynamo to cause it to build up quickly and for cutting down said tendency to over-excite as it builds up responsive to variations in the output of said dynamo.

15. In an electrical system of distribution, a main generator and its circuit, a storage battery in operative relation thereto, means for regulating the action of the storage battery including a regulating dynamo responsive to electrical variations in the system, an exciter therefor constructed and arranged to produce an abnormal voltage at the fields of the dynamo to cause the effect of the exciter to be more quickly felt and a field coil on the exciter for cutting down the effect of said abnormal voltage as the magnetization of the dynamo reaches its normal value so that the output of the dynamo will not exceed or drop below the desired value.

In testimony whereof, I have signed my name to this specification, in the presence of two subscribing witnesses.

ALBERT S. HUBBARD.

Witnesses:
 GORHAM CROSBY,
 EDWIN SEGER.

---

Copies of this patent may be obtained for five cents each, by addressing the "Commissioner of Patents, Washington, D. C."